United States Patent
Dong et al.

(10) Patent No.: US 6,738,082 B1
(45) Date of Patent: May 18, 2004

(54) SYSTEM AND METHOD OF DATA ENTRY FOR A CLUSTER ANALYSIS PROGRAM

(75) Inventors: Jianming Dong, Austin, TX (US); Shirley Lynn Martin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 560 days.

(21) Appl. No.: 09/584,593

(22) Filed: May 31, 2000

(51) Int. Cl.[7] .................................................. G09G 5/00
(52) U.S. Cl. ...................................... 345/769; 345/866
(58) Field of Search ................................ 345/700, 764, 345/769, 751, 759, 866; 707/1, 7, 102; 702/179; 705/12, 10

(56) References Cited

U.S. PATENT DOCUMENTS

| | | | | |
|---|---|---|---|---|
| 5,774,121 A | * | 6/1998 | Stiegler | 345/769 |
| 5,790,426 A | * | 8/1998 | Robinson | 702/179 |
| 5,970,471 A | * | 10/1999 | Hill | 705/26 |
| 6,025,843 A | * | 2/2000 | Sklar | 345/841 |
| 6,064,980 A | * | 5/2000 | Jacobi et al. | 705/26 |
| 6,125,340 A | * | 9/2000 | Miles | 702/181 |
| 6,195,657 B1 | * | 2/2001 | Rucker et al. | 707/5 |
| 6,381,644 B2 | * | 4/2002 | Munguia et al. | 709/225 |

OTHER PUBLICATIONS

Microsoft Outlook 2000 Screenshots. Microsoft Corporation. Copyright 1995–1999. Captured Jun. 2, 2003.*

* cited by examiner

*Primary Examiner*—John Cabeca
*Assistant Examiner*—Brian Detwiler
(74) *Attorney, Agent, or Firm*—Duke W. Yee; Volel Emile; Stephen R. Tkacs

(57) ABSTRACT

A graphical user interface for use in a data processing system for facilitating data entry for cluster analysis. In a preferred embodiment, the graphical user interface includes a source card list area, a participants area, a first sort area, and a second sort area. The source card list area allows entry, display of, and direct manipulation access to all of a plurality of items to be sorted. The participants area allows entry and display of participant names. The first sort area includes a plurality of first sections that each can contain a set of items dragged from the source card list area and represents a first-level of grouping of the items from the source card list area. The second sort area includes a plurality of second sections. Each of the plurality of second sections may contain items dragged from at least one of the first sections and represents a second-level of grouping of the items from the source card list area.

15 Claims, 10 Drawing Sheets

SYSTEM AND METHOD OF DATA ENTRY FOR A CLUSTER ANALYSIS PROGRAM

BACKGROUND OF THE INVENTION

1. Technical Field

The present invention relates generally to computer software and, more particularly, to a method and system for data entry for cluster analysis.

2. Description of Related Art

Cluster analysis is an exploratory data analysis tool for solving classification problems. Its object is to sort cases (people, things, events, etc.) into groups, or clusters, so that the degree of association is strong between members of the same group and weak between members of different groups. Each such cluster thus describes, in terms of the data collected, the class to which its members belong. This description may be abstracted through use from the particular to the general class or type.

Cluster analysis is thus a tool of discovery. It may reveal associations and structure in data which, though not previously evident, nevertheless are sensible and useful once found. The results of cluster analysis may contribute to the definition of a formal classification scheme, such as a taxonomy for related animals, insects or plants; or suggest statistical models with which to describe populations; or indicate rules for assigning new cases to classes for identification and diagnostic purposes; or provide measures of definition, size and change in what previously were only broad concepts; or find exemplars to represent classes.

One useful application of cluster analysis is to analyze data from card-sorting exercises. In a card-sorting procedure, representative users of a product or technology arrange cards representing data objects into groups on the basis of their perceived relatedness. Cluster analysis of the resulting groups can help researchers to understand users' perceptions of the degree of relatedness of items in data sets.

Multiple software packages are currently available that allow developers to utilize cluster analysis to translate user expectations into a meaningful organization of a web site. However, currently available cluster analysis software is prohibitively difficult to use for non-professional statisticians. These software packages require the user to calculate and construct similarity or distance matrices from raw data. Only after these matrices have been painstakingly constructed will the packages perform cluster analyses. Therefore, it would be advantageous to have a method and apparatus that provides a simpler user interface and method for users to enter raw data into a cluster analysis software package. Furthermore, a cluster analysis software package that does not require the user to perform numerous calculations or construct matrices would also be advantageous.

SUMMARY OF THE INVENTION

The present invention provides a graphical user interface for use in a data processing system for facilitating data entry for cluster analysis. In a preferred embodiment, the graphical user interface includes a source card list area, a participants area, a first sort area, and a second sort area. The source card list area allows entry and display of, and direct manipulation access to, all of a plurality of items to be sorted. The participants area allows entry, display and editing of participant names. The first sort area includes a plurality of first sections, each of which may contain a set of items dragged from the source card list area. Each of these first sections represents a first-level grouping of the items from the source card list area. The second sort area includes a plurality of second sections. Each of the plurality of second sections may contain items dragged from at least one of the first sections, and represents a second-level grouping of the items from the source card list area.

BRIEF DESCRIPTION OF THE DRAWINGS

The novel features believed to be characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
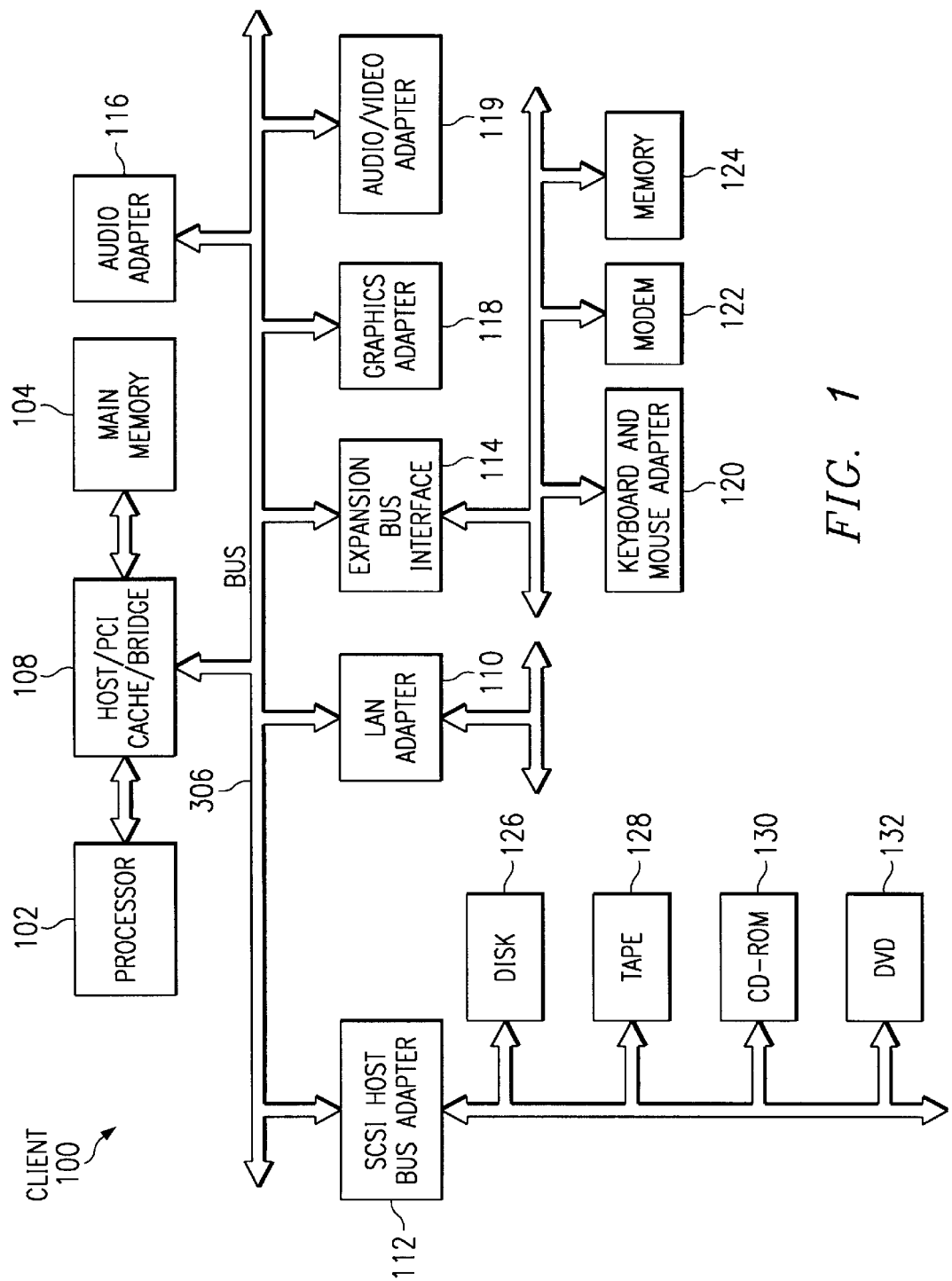
FIG. 1 depicts a block diagram of a data processing system in which the present invention may be implemented.

With reference now to the figures, and in particular with reference to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 may also include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. In the depicted example, SCSI host bus adapter 112 provides a connection for hard disk drive 126, tape drive 128, CD-ROM drive 130, and digital video disc read only memory drive (DVD-ROM) 132. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 100. Instructions for the operating system, the object-oriented operating system, and applications or programs are located on a storage device, such as hard disk drive 126, and may be loaded into main memory 104 for execution by processor 102.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, the processes of the present invention may be applied to multiprocessor data processing systems.

The present invention provides a graphical user interface for data entry into a cluster analysis program to allow users using card-sorting and cluster analysis to be involved in the organizational design of Web sites. Members of a site's target audience sort physical cards representing key pages of a proposed site into groups. These cards may be images of a sample web page or may simply be text indicating the content of the web page. Cluster analysis is then performed across all participants' card groupings to produce site diagrams. By revealing the perceived relatedness of the key pages, these diagrams can help guide the navigational design of the site to meet users' expectations, resulting in a more usable site.

The organizational structure of a Web site can have a profound effect on its ease of use. An ideal structure would allow users to navigate freely and confidently through the site, while a less-than-ideal structure can throw obstacles between the users and their goals. Many corporate Internet sites inherit their structures from the internal structures of their companies, grouping the pages of the site according to the divisions that produce them. Unfortunately, most visitors to these sites are unfamiliar with the inner workings of the companies, and are unlikely to find this kind of site easy to navigate.

A more user-oriented approach to site structure design requires evaluating users' expectations for organizing a Web site. One method of collecting data on users' organizational expectations is card sorting. In a card-sorting test, participants are presented with randomly ordered cards representing pages of a Web site, and group the cards as they see fit.

Learning how users group pages is useful, but how can site designers reconcile the various groupings that different users choose? Some Web site designers have "eyeballed" card groupings created by a few test participants, and somehow divined a central tendency from the competing sorting structures. This method, if ever it were manageable, becomes unwieldy very quickly with the inclusion of more than a handful of topics or users. However, "eyeballing" groupings becomes much harder as the number of cards or participant grows. Subjective judgments often cause incorrect decisions.

Cluster analysis of card-sorting data is a promising quantitative method for making sense of multiple participants' input to the organization of Web site pages. Cluster analysis quantifies card-sorting data by calculating the strength of the perceived relationships between pairs of cards, based on how often and at which level the members of each possible pair appear in a common group. The cumulative number of times that each pair of cards is grouped together yields the "raw similarity score". These raw similarity scores are divided by the maximum possible raw score.

The array of these normalized similarity scores forms a "similarity matrix". The highest possible score in a similarity matrix is 1, meaning that the corresponding pair of cards is always grouped together by participants. The lowest score in a similarity matrix is 0, meaning that the corresponding pair of cards is never grouped together by any participants. A distance matrix is constructed by subtracting each similarity score in the similarity matrix from 1, resulting in a "distance" from the best possible similarity.

The cluster analysis program manipulates the similarity matrix or the distance matrix and generates output in the form of tree diagrams, in which the relationship between each pair of cards is represented graphically by the distance between the origin and the branching of the lines leading to the two cards. There are several different algorithms to decide where the joint node of card clusters are located. (Joint nodes are the points where the tree structure branches.) These algorithms interpret the input data in different perspectives and are not mutually exclusive. In most cases, the tree structures that are generated by different algorithms have similar patterns, which can be used in cluster analysis. Researchers choose the algorithm based on the specific scenario.

Card sorting is a data collection method that can be particularly useful for understanding users' perceptions of relationships between items. In the example described here, participants sort cards that display contents of a Web site's most important pages. The strengths of the page relationships are calculated by assigning similarity points to each pair of cards each time a participant places them in a common group. The points are totaled across all participants and converted into a distance score for each possible pair of cards. Then the distance scores are compared using a cluster analysis program that arranges pages into a tree structure.

Figure 2:
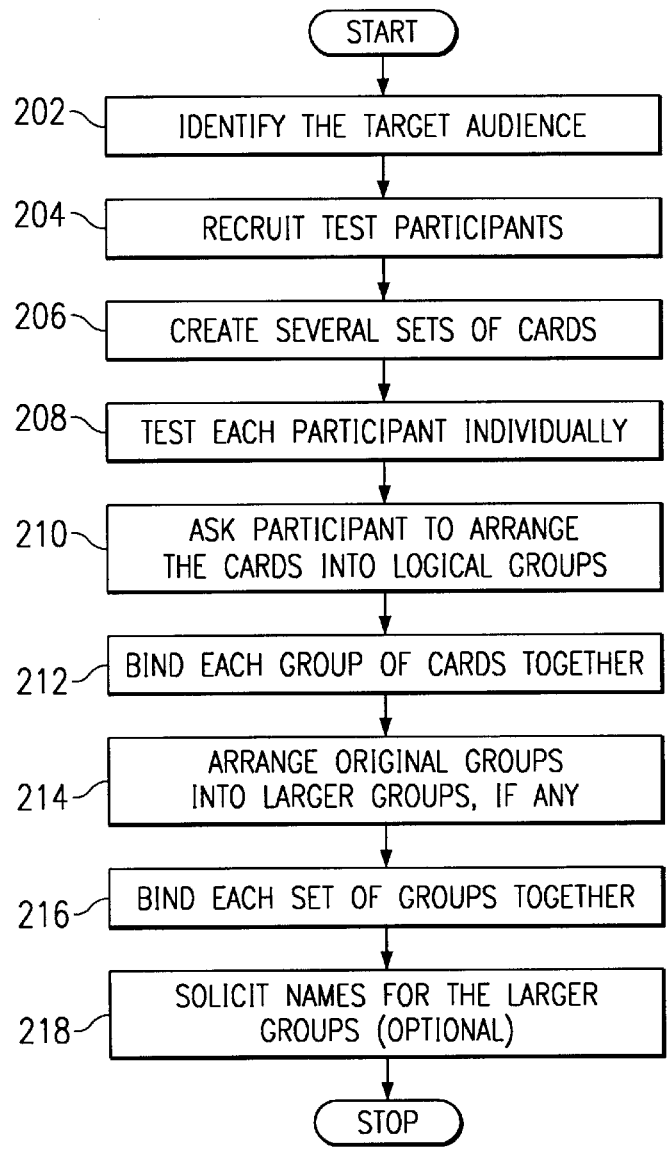
FIG. 2 depicts a flowchart illustrating a method of performing a card-sorting test for use in a cluster analysis program in accordance with the present invention.

Referring now to FIG. 2, a flowchart illustrating a method of performing a card-sorting test for use in a cluster analysis program is depicted in accordance with the present invention. As in any user involvement activity, the first step of a card-sorting test is to identify the target audience for the site (step 202). This step is essential and deserves special attention because different groups of users will expect different arrangements of site content. An audience description should include all the qualities that pertain to their interest in the site; for example, a target audience could be "information technology professionals whose job responsibilities have included making hardware or software purchasing decisions." If the site is intended to serve more than one audience, testing should include representatives of each user group.

When the audience descriptions are complete, test participants who match those descriptions are recruited (step 204). It is important that the participants have no more familiarity with the company or organization the site represents than do the target audience members.

Next, a test administrator creates several sets of paper or poster board cards representing information for inclusion in the Web site (see FIG. 3 for an example of a "page" card 300) (step 206). The information on each card should include a title and a one-sentence summary of the contents of that page. The cards are shuffled thoroughly to assure random arrangement within each set. If users perceive any logical ordering in the cards as initially presented, that ordering may influence the users' groupings.

Turning now to the test procedure, it is highly suggested that each participant be tested in an individual session to assure independence of grouping strategies (step 208). Although it may seem economical to have several test participants arrange card sets in a single session, the results of multiple-user sessions may be less reliable than those of individual sessions for a couple of reasons. In a multiple-participant situation, participants may influence one another's number of card groups or sorting criteria. Participants also may be reluctant to take as much time as they need for careful sorting if they see that others have completed the task. Because these influences can be subliminal, their effects cannot be avoided through instructions to disregard other participants.

Figure 3:
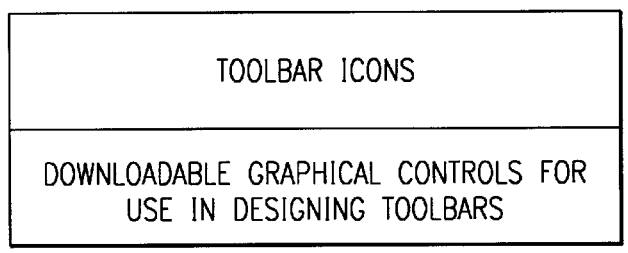
FIG. 3 depicts an example of a "page" card for use in performing cluster analysis in accordance with the present invention.

Each participant is asked to arrange the cards into logical groups (step 210). Card 300, illustrated in FIG. 3, is an example os a sample page card for the card-sorting task. It should be explained that the groups should contain topics that seem to that participant to be related. An example instruction reads:

"Please arrange the cards into groups in a way that makes sense to you. There are no right or wrong answers; we are interested in what you perceive to be the most logical arrangement of the cards."

When the participant is satisfied with the groupings, each group of cards is bound together (step 212). The cards are bound in such a way as to discourage the participant from moving cards from one group to another. Cluster analysis assumes that participants are making the groupings independently, without planning further levels of categorization. The participant is then asked to arrange the original groups into larger groups if any further logical groupings are apparent (step 214). When the participant is satisfied with the second grouping, or has stated that no further grouping is logical beyond the first pass, each set of groups is bound with a clip or rubber band (step 216).

As an option, one can solicit suggestions for names for the larger groups (step 218). If suggestions for group names are needed, supply self-adhesive note paper and ask participants to label the groups they created. As discussed above, participants should not be forewarned that they will be providing names for the bundles. They should feel free to group the cards as their "gut" requires, without concern for how to articulate or explain the basis of the groupings.

The test procedure should be explained only incrementally over the course of testing. The entire procedure should not be explained to the participants at the beginning of the test; explaining that they will be arranging topic cards into groups will suffice. The cluster analysis below is designed to work on the assumption that participants completed the first sorting without planning any subsequent bundling of the groups, and both sorting passes without concern for naming the groups.

Cluster analysis is rarely applied to card-sorting data, probably due to the tedious procedures required for getting the user data into, and interpreting the output of, currently available statistical packages such as, for example, SAS™ or Statistica™. Both of these popular packages require converting the raw user data (card groups) into matrices of either distance scores or similarity scores. This conversion can take several hours per test participant if performed by hand. The packages' output is also difficult to manage. The packages produce tree diagrams that illustrate the relationships users perceived between the cards, but provide no assistance in visualizing the consequences of choosing various criteria for grouping the pages.

Cluster analysis is not by its nature a definitive test to determine which items belong together. It extracts from card-sorting data the relative strength of perceived relationships between pairs of items, allowing site designers to consider these perceptions when organizing the site.

The diagrams indicate the strength of the perceived relationships between pairs of pages by the relative distance from the origin (0) of the nearest vertical line that connects the pages' horizontal lines. To find the strength of the perceived relationship between any two pages, trace a path from one of the pages to the other, following the branches of the dendogram, and taking the shortest possible path. The distance from 0 to the outermost vertical line required by this path represents the perceived degree of difference in meaning between the two pages. The maximum distance, 1.00, indicates that no participant grouped the two cards together; while the minimum distance, 0.00, means that every participant grouped the two cards together in both stages of the sorting procedure.

Figure 4:
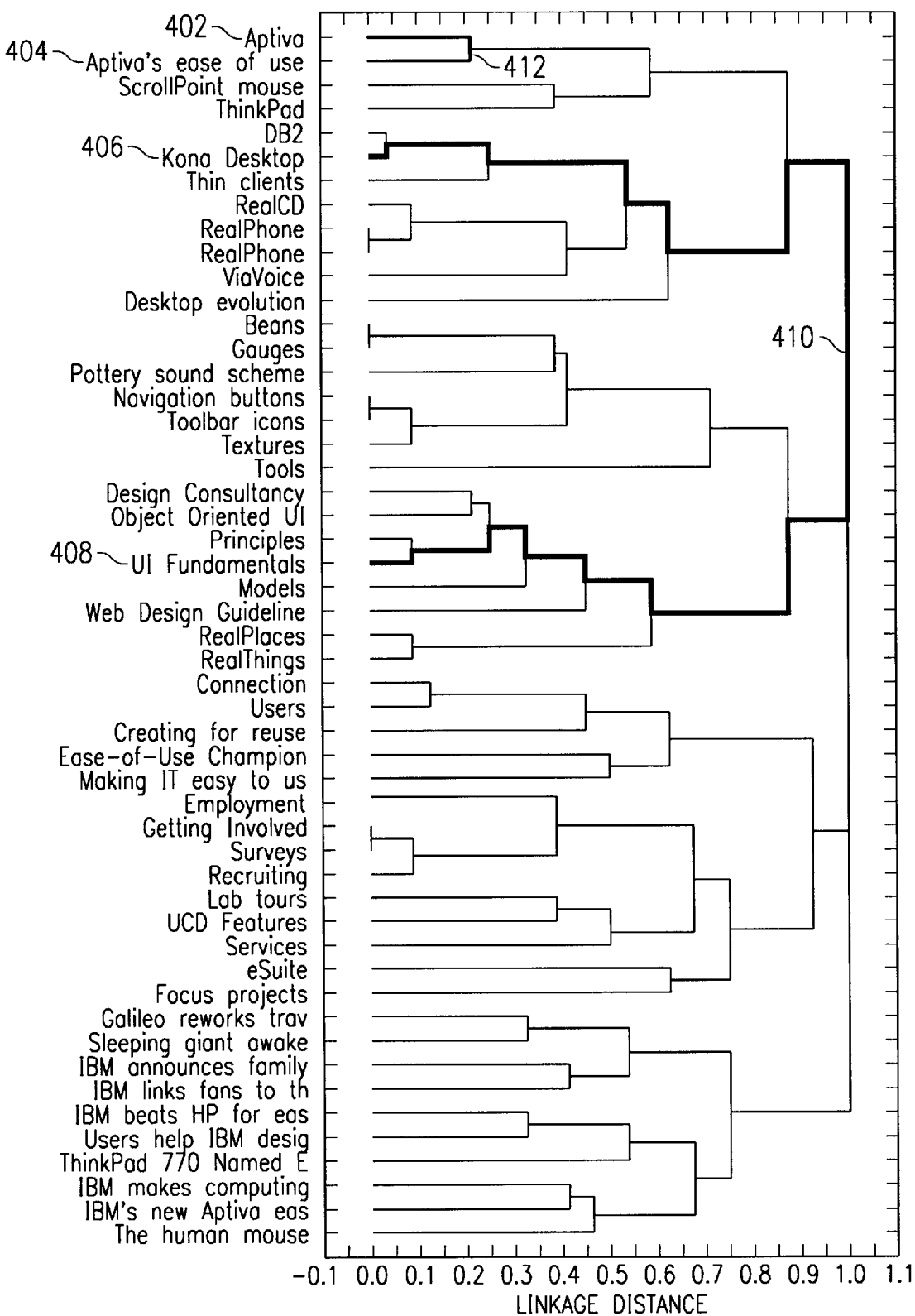
FIGS. 4–6 depict diagrams illustrating the relationships between pairs of pages in accordance with the present invention.

Referring now to FIG. 4, a diagram illustrating the relationships between pairs of pages is depicted in accordance with the present invention. The first sample pair is composed of the pages labeled Aptiva 402 and Aptiva's ease of use 404. This pair is connected by a vertical line 412 at approximately 0.22, indicating that participants perceived these pages as being relatively closely related. The other highlighted pair in FIG. 4 is Kona Desktop 406 and UI Fundamentals 408. The outermost vertical line 410 required by the path between these two pages falls at 1.00, indicating that participants never placed them in a common group. (A 1.00 in a dissimilarity matrix corresponds to a 0.0 in a similarity matrix.)

Figure 5:
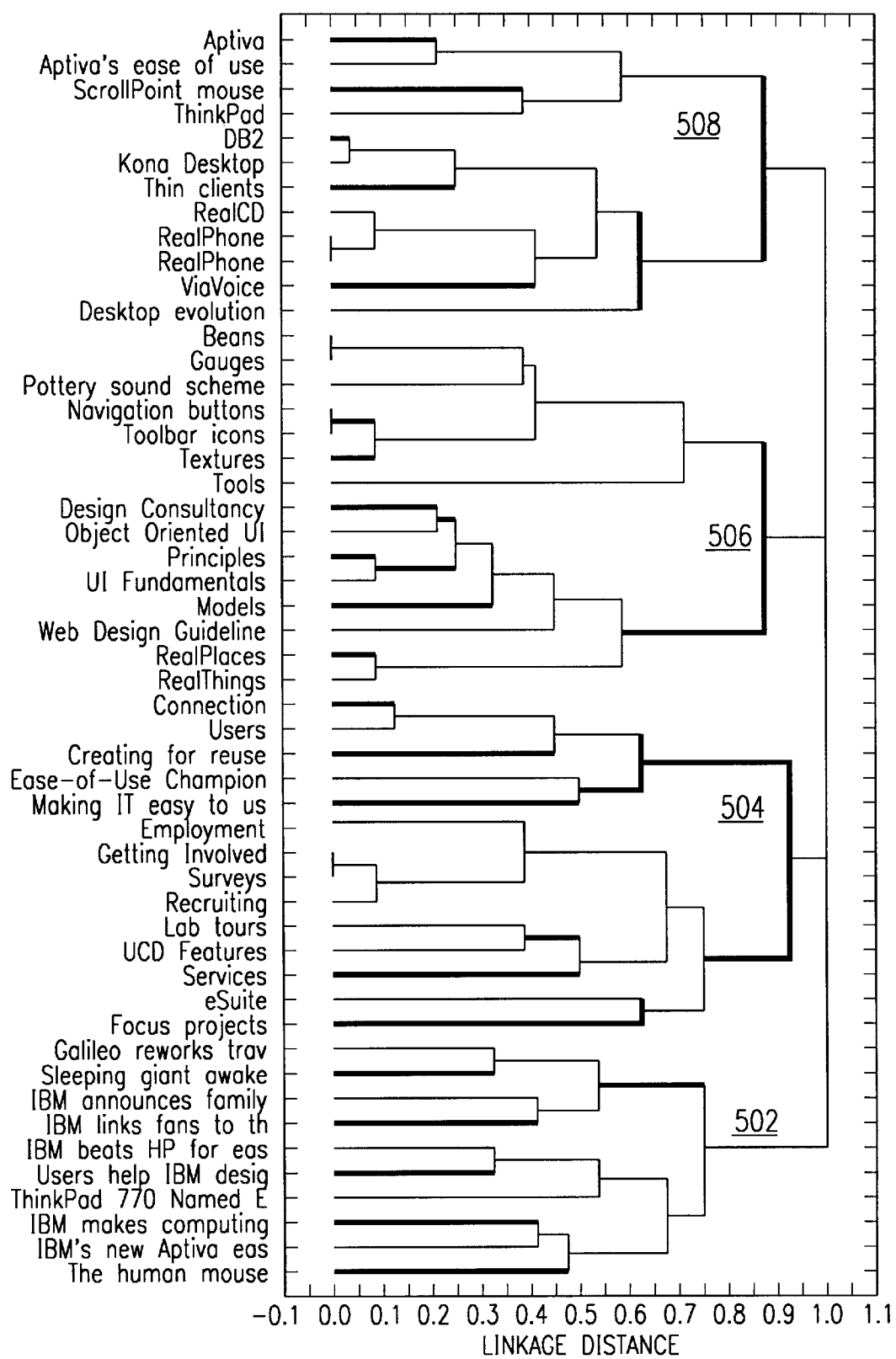

With reference now to FIG. 5, a diagram illustrating the relationships between pairs of pages showing the major divisions of the site is depicted in accordance with the present invention. The major divisions of the site 502, 504, 506, and 508 (indicated in FIG. 5 by shading changes.) were obtained by drawing a vertical line at the 0.925 hash mark, and grouping together any pages whose connecting lines fall to the left of this point. This distance threshold was chosen by experimenting until a reasonable number of major divisions (in this example, four) resulted. Though setting criteria post-hoc is usually frowned upon in statistical analysis, this type of cluster analysis is an exception. It would be impractical to establish cutoff values prior to seeing an output diagram.

Figure 6:
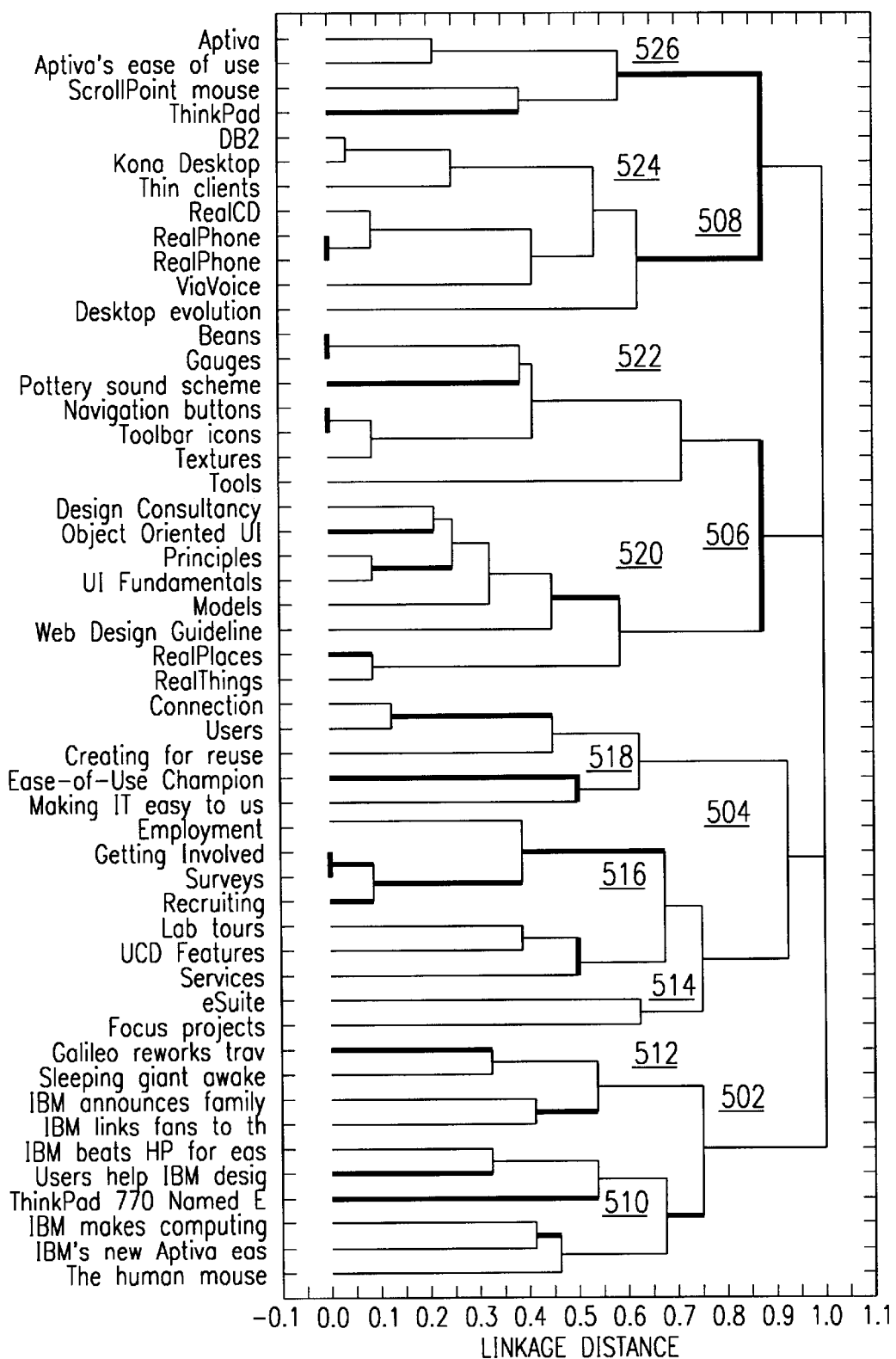

In FIG. 6, a second threshold has been established for the minor divisions 510, 512, 514, 516, 518, 520, 522, 524, and 526 within the larger groups in FIG. 5. The minor divisions 510, 512, 514, 516, 518, 520, 522, 524, and 526 are distinguished again by variations in shading. In this example, minor divisions 510 and 512 are part of major division 502; minor divisions 514, 516, and 518 are part of major division 504; minor divisions 520 and 522 are part of major division 506; and minor divisions 524 and 526 are part of major division 508. Again, a distance criterion was established by observing the effects of various placements of the threshold line until a suitable number of groups resulted.

Card-sorting tests and cluster analysis can help site designers understand their target audience's expectations for site content organization. These procedures provide a method for quantifying the relationships users perceive between the content pages of a site. They allow users' expectations to influence a site's navigational structure. Site designers can use the results to help determine a structure that their audiences will understand.

Figure 7:
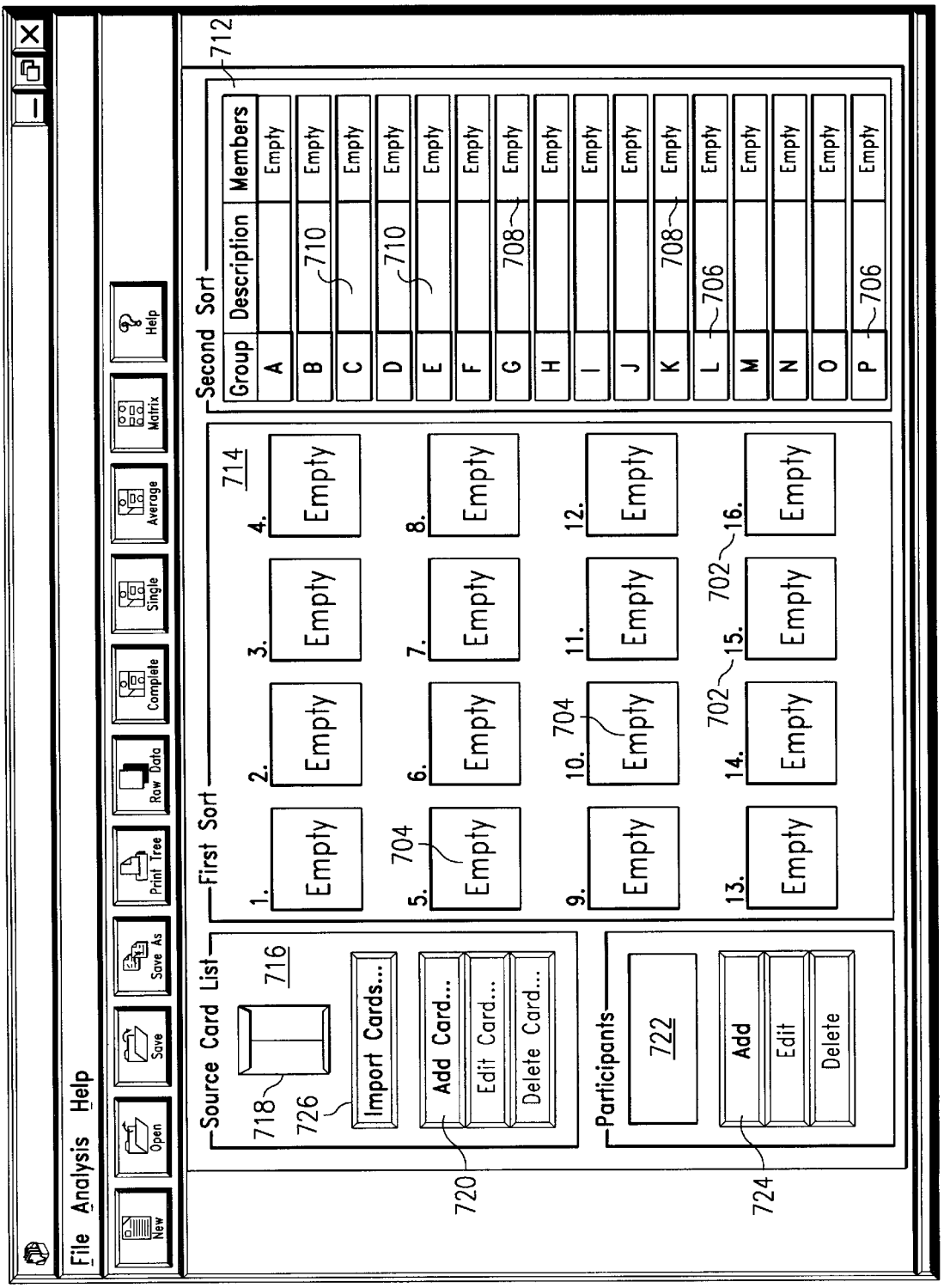
FIGS. 7–9 each depict an example of a graphical user interface for facilitating entry of data into a cluster analysis program in accordance with the present invention.

Referring now to FIG. 7, a pictorial diagram illustrating a graphical user interface for facilitating entry of data into a cluster analysis program is depicted in accordance with the present invention. The example shown discloses a method of data entry as applied to card-sorting test data, but it will be recognized that the present invention is applicable to any kind of data appropriate for cluster analysis. Graphical user interface 700 is an example of a graphical user interface which may be utilized in conjunction with a cluster analysis program to facilitate entry of data into the program. Such a cluster analysis program and graphical user interface 700 may be implemented in a data processing system such as, for example, data processing system 100.

Graphical user interface 700 includes a source card list area 716, a participants area 722, a first sort area 714, and a second sort area 712. Source card list area 716 allows entry, display of, and direct manipulation access to all of the items to be sorted. Source card list area 716 includes an import cards button 726 that allows a user to import cards from a file outside the cluster analysis program. Source card list area 716 also includes a collection of edit buttons 720 that allow a user to add, edit or delete a card from the source card list. Manila folder icon 718 indicates that the card name field is currently empty.

Participants area 722 allows entry and display of participants' names and includes edit buttons 724 to allow a user to add, edit, or delete a participant. First sort area 714 includes a plurality of boxes 704 for storing card names that are dragged and dropped from source card list 716. Each of the plurality of boxes 704 is identified by a serial number 702. Second sort area 712 includes a first plurality of boxes 710 for second level grouping names and a second plurality of boxes 708 for storing serial numbers of first level groups which form the members of the second level group. Each of the first plurality of boxes 710 corresponds to a distinct one of the second plurality of boxes 708 and also to a unique identifier 706 for second sort categories.

Figure 8:
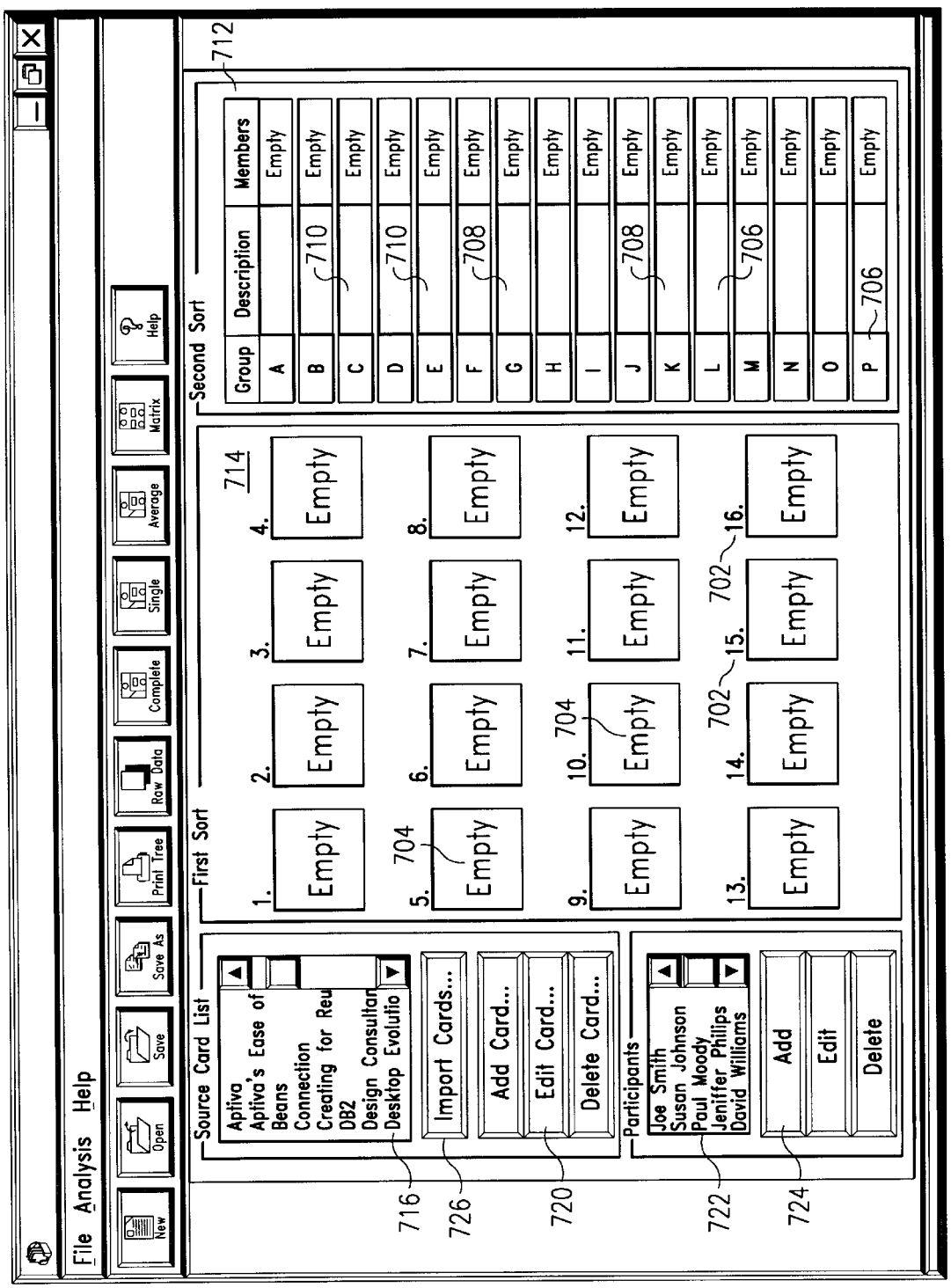

Referring now to FIG. 8, graphical user interface 700 is depicted with entries to the source card list area 716 and participants area 722.

Figure 9:
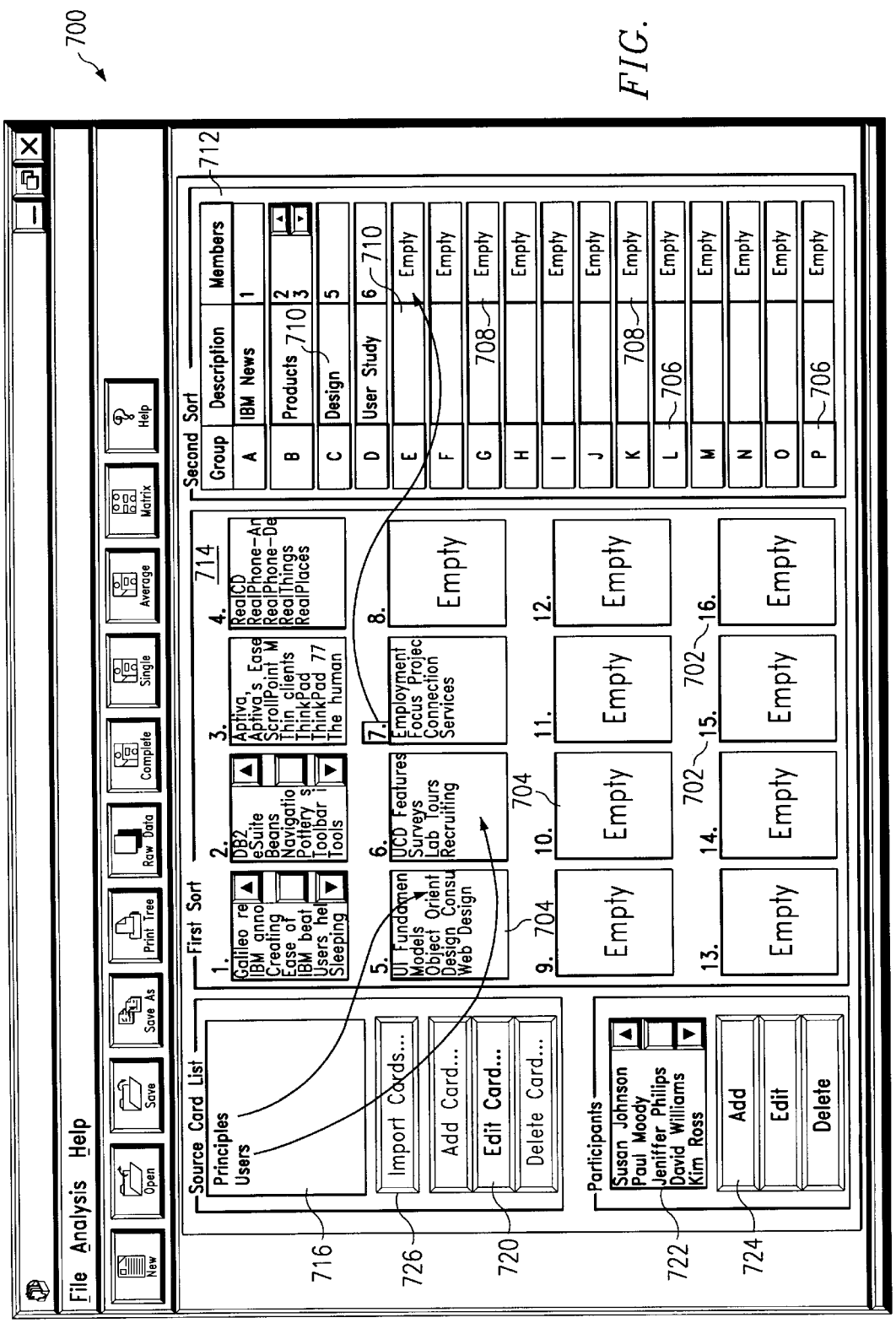

Referring now to FIG. 9, graphical user interface 700 is depicted in which several of the card entries for participant "Paul Moody" in participant area 722 have been dragged to various ones of the plurality of boxes 704. Each time a card name from source card list 716 is dragged and dropped into a one of boxes 704, it disappears from source card list 716 thus preventing the user from inadvertently placing a card name into more than one of boxes 704. Referring briefly to FIG. 8, the card name "Aptiva" appears at the top of source card list 716. In FIG. 9, the card name "Aptiva" has been moved to the one of boxes 704 identified by the serial number "3." The user moves card names from source card list 716 into various ones of boxes 704 as indicated by how the particular participant highlighted in participants area 722 had previously indicated the cards should be grouped. If second order grouping is applicable for the particular situation, the user then selects a serial number corresponding to one of boxes 704 and copies that number into one of boxes 708 corresponding to a second order group. This process continues until each of the card names in source card list 716 has been moved to one of boxes 704 for each participant in participant area 722.

In the depicted example, the card name "users" is in the process of being moved from source card list 716 into the one of boxes 704 identified by serial number "6". The card name "principles" may be moved, as indicated by the arrow, into the one of boxes 704 identified by serial number "5" corresponding to the manner in which the highlighted participant "Paul Moody" in participant area 722 grouped the cards. Also in the depicted example in FIG. 9, the one of boxes 704 in first sort area 714 identified by serial number "7" may be copied, as indicated by the arrow, into the one of boxes 708 in second sort area 712 corresponding to group "E" to correspond to the way the highlighted participant, "Paul Moody," further grouped the first groups in first sort area 714. Others of boxes 704 have previously been copied into one of boxes 708. For example, the one of boxes 708 corresponding to Group B in second sort area 712 has had serial numbers "2" and "3" from first sort area 714 copied into it. Thus, the members of group B in second sort area 712 include all card names placed in the one of boxes 704 identified by serial number "2" and the one of boxes 704 identified by serial number "3."

Note that, as an option, the user can enter a name or identification for each group in second sort area 712. These names or identifications are entered into ones of boxes 710. Also note that particular ones of boxes 704, 708, and 710 that are not needed for a particular cluster analysis remain empty.

Once the sorted cards are entered for each user, the cluster analysis program may then compute a similarity matrix and a distance matrix. Thus, the user is freed from the tedious and complex task of computing the matrices by hand. Because of the drag and drop method of moving card names into a particular grouping box 704 that removes the name from source card list area 716 as it is moved into first sort area 714, the potential for mistakenly placing a card name in more than one group is removed.

Figure 10:
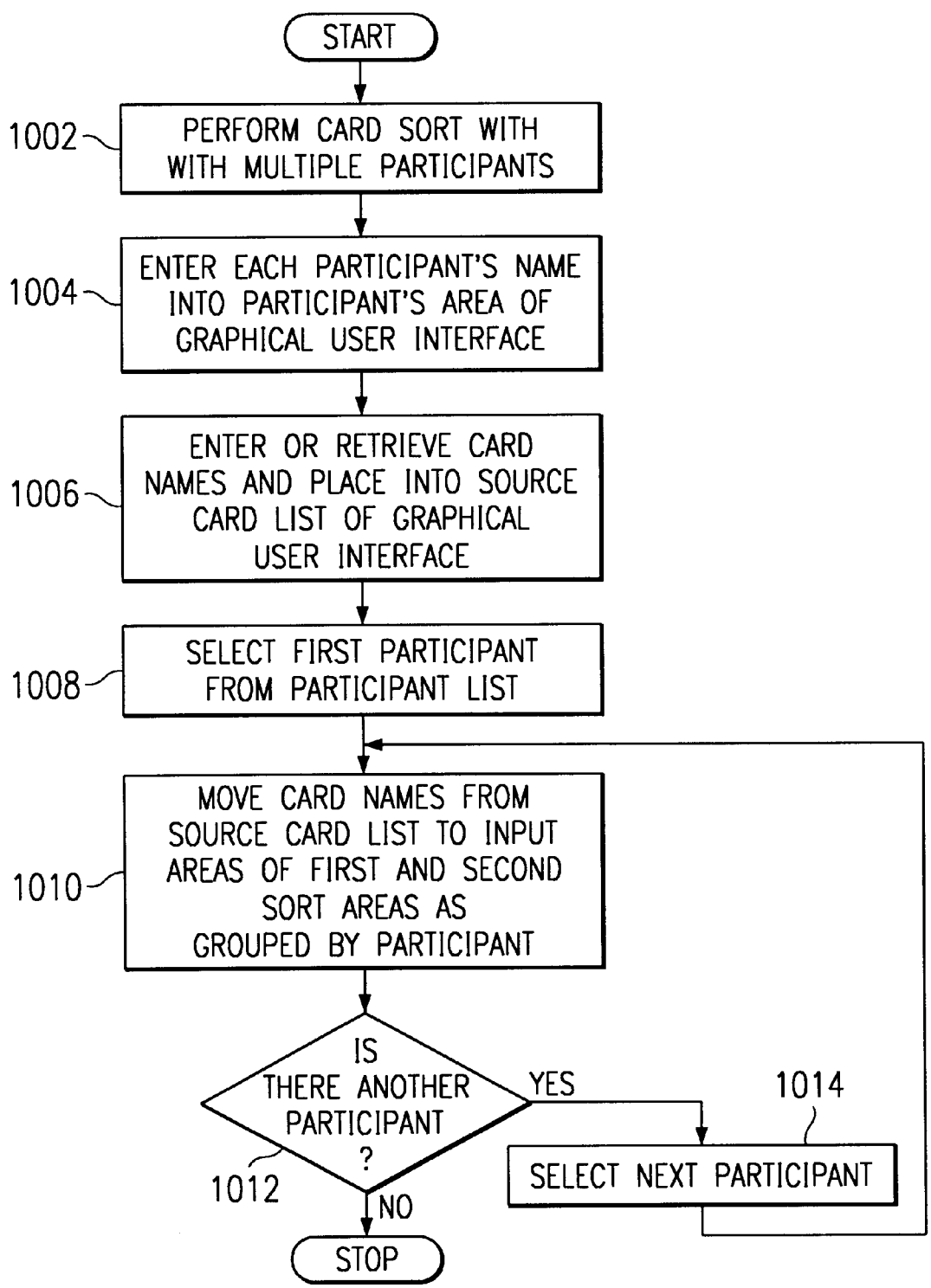
FIG. 10 depicts a flowchart illustrating a method of allowing data entry into a cluster analysis program using a graphical user interface in accordance with the present invention.

Referring now to FIG. 10, a flowchart illustrating a method of allowing data entry into a cluster analysis program using a graphical user interface is depicted in accordance with the present invention. First, a card sort with multiple participants must be performed as described above (step 1002). Next, the test proctor must enter the name of each participant into the participants area 722 of the graphical user interface 700 (step 1004). The names of the cards that were used in the card sort exercise must be entered or imported into the source card list 616 graphical user interface 700 (step 1006). The test proctor then selects the first participant from the participant list (step 1008), such as, for example, by highlighting the participants name using a mouse, and moves the card names from the source card list area 716 to one of the entry blocks 704 and then, if further grouping has been made, select and copy entry block reference numbers 602 to the ones of blocks 608 that correspond to how the participant further grouped the cards (step 1010). The card names are moved into the entry blocks 704 that correspond to the way in which the current participant grouped the cards in the card sort exercise. Once all the card names have been moved into the appropriate entry blocks 704 for the present participant, then it must be determined if there is another participant whose card groupings have not been entered (step 1012). If there is another participant, then the next participant is selected (step 1014) and the card names are moved from source card list 716 to entry blocks 704 in accordance with the manner in which this new participant grouped the cards (step 1010). If there are no more participants, then the process of data entry ends.

Figure 11:
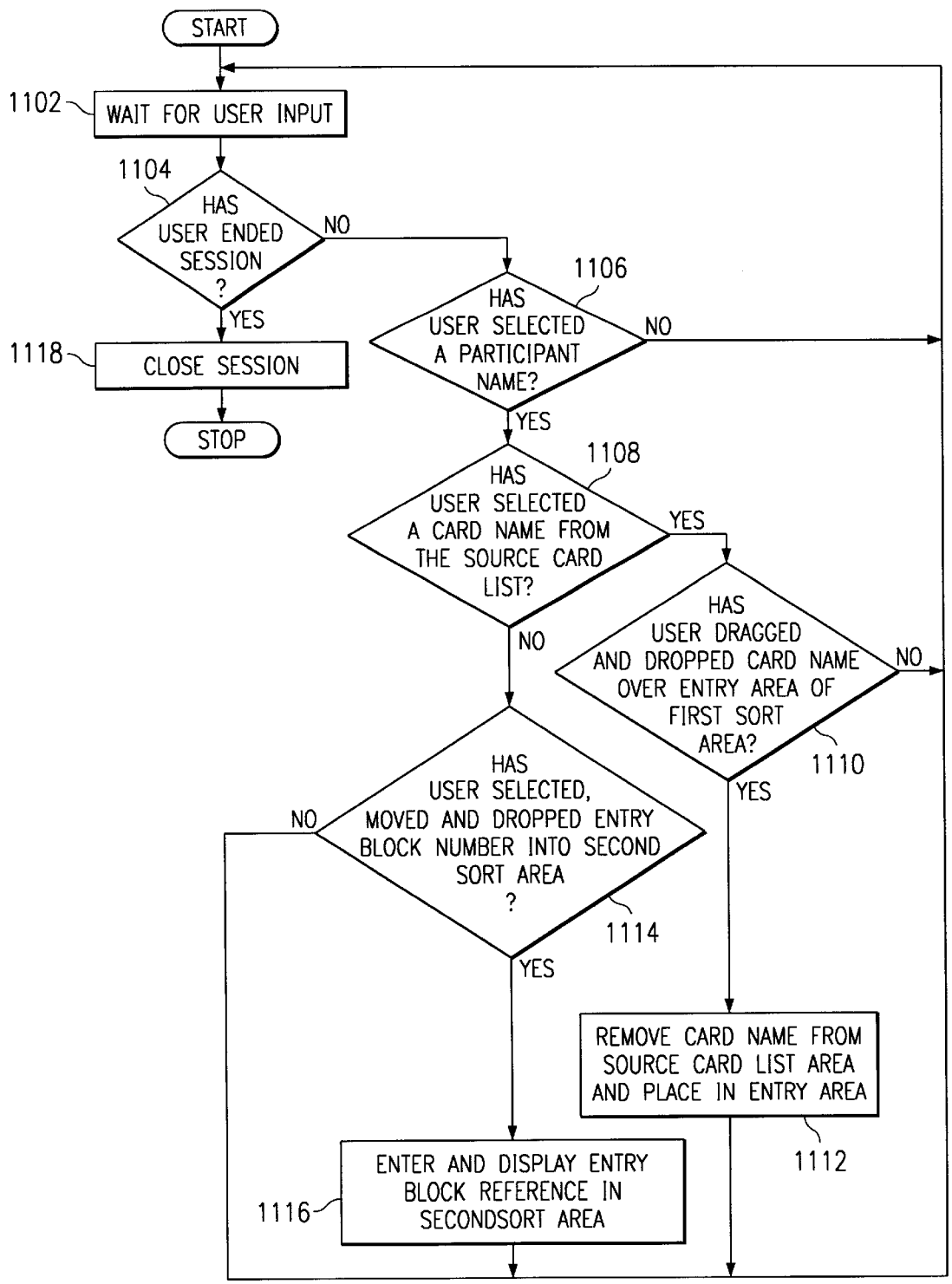
FIG. 11 depicts a flowchart illustrating an exemplary method in a data processing system for allowing entry of card sorting results in accordance with the present invention.

Referring now to FIG. 11, a flowchart illustrating an exemplary method in a data processing system for allowing entry of card sorting results is depicted in accordance with the present invention. After a user opens the cluster analysis program, the program waits for user input (step 1102). Once user input has been received, the cluster analysis program determines whether the user has requested to end the session (step 1104). If the user has requested to end the session, then the program is closed (step 1118).

If the user has not requested to end the program, then the cluster analysis program determines whether the user has selected a participant name from participants area 722 (step 1106). If no participant name has been selected, then the program continues to wait for user input (step 1102). If a participant name has been selected, then the program determines if a card name from the source card list 716 has been selected (step 1108). If a card name has been selected from the source card list 716, the program determines whether the user has dragged and dropped the card name over one of entry area blocks 704 in the first sort area 714 (step 1110). If the user has not dragged and dropped the card name over one of the entry blocks 704, then the program continues to wait for further use input (step 1102). If the user has dragged and dropped the card name over an entry area 704, then the card name if removed from source card list area 716 and is placed into the user specified one of entry blocks 704 (step 1112) and the program waits for further user input (step 1102).

If the user has not selected a card name from the source card list, the program determines whether the user has selected, moved, and dropped an entry block reference number 702 into one of blocks 708 in the second sort area 712 (step 1114). If a user has not selected, moved, and dropped an entry block reference number 702 into the second sort area 712, then the program continues to wait for further user input (step 1102). If the user has selected, moved, and dropped an entry block reference number 702 into the second sort area 712, then the number of the entry block reference number 702 that was moved is entered into the specific one of blocks 708 chosen by the user (step 1116), at which point the program continues to wait for further user input (step 1102).

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method of providing entry of data into a cluster analysis program, comprising the steps of:

a) presenting a set of card names in a source card list area for a participant;
    b) responsive to user input, moving selected card names from the source card list area to first grouping area sections to form card sorting data;
    c) repeating steps (a) and (b) for a plurality of participants;
    d) providing the card sorting data for the plurality of participants to the cluster analysis program; and
    e) generating, using the cluster analysis program, difference scores for each pair of card names within the set of card names based on the card sorting data.

2. The method as recited in claim 1, further comprising:
    responsive to user input, entering an identification number corresponding to a user selected one of the plurality of first grouping area sections into a user selected one of a plurality of second grouping area sections.

3. The method as recited in claim 1, wherein the plurality of first grouping area sections comprises an array of boxes in which card names from the source card list area may be placed and displayed.

4. The method as recited in claim 2, wherein the plurality of second grouping area sections comprise a plurality of rows wherein each row contains at least one box configured to display the identification numbers.

5. The method of claim 1, further comprising:
    generating, using the cluster analysis program, a difference matrix for a set of card names using the difference scores.

6. A computer program product in computer readable media for use in a data processing system for providing entry of data into a cluster analysis program, the computer program product comprising:
    first instructions for presenting a set of card names in a source card list area for a participant;
    second instructions, responsive to user input, for moving a selected card names from the source card list area to a plurality of first grouping area sections to form card sorting data, wherein the first instructions and the second instructions are repeated for a plurality of participants; and
    third instructions for providing the card sorting data for the plurality of participants to the cluster analysis program,
    wherein the cluster analysis program generates difference scores for each pair of card names within the set of card names based on the card sorting data.

7. The computer program product as recited in claim 6, further comprising:
    fourth instructions, responsive to user input, for entering an identification number corresponding to a user selected one of the plurality of first grouping area sections into a user selected one of a plurality of second grouping area sections.

8. The computer program product as recited in claim 6, wherein the plurality of first grouping area sections comprises an array of boxes in which card names from the source card list area may be placed and displayed.

9. The computer product as recited in claim 7, wherein the plurality of second grouping area sections comprise a plurality of rows wherein each row contains at least one box configured to display the identification numbers.

10. The computer program product of claim 6, wherein the cluster analysis program generates a difference matrix for the set of card names using the difference scores.

11. A data processing system for providing entry of data into a cluster analysis program, comprising:

means for processing a set of card names in a source card list area for a participant;

means, responsive to user input, for moving a selected card names from the source card list area to a plurality of first grouping area sections to form card sorting data;

means for collecting card sorting data from a plurality of participants; and means for providing the collected card sorting data to the cluster analysis program, wherein the cluster analysis program generates difference scores for each pair of card names within the set of card names based on the card sorting data.

12. The data processing system as recited in claim 11, further comprising:

means, responsive to receiving user input, for entering an identification number corresponding to a user selected one of the plurality of first grouping area sections into a user selected one of a plurality of second grouping area sections.

13. The data processing system as recited in claim 11, wherein the plurality of first grouping area sections comprises an array of boxes in which card names from the source card list area may be placed and displayed.

14. The data processing system as recited in claim 12, wherein the plurality of second grouping area sections comprise a plurality of rows wherein each row contains at least one box configured to display the identification numbers.

15. The data processing system of claim 11, wherein the cluster analysis program generates a difference matrix for the set of card names.

* * * * *

UNITED STATES PATENT AND TRADEMARK OFFICE
CERTIFICATE OF CORRECTION

PATENT NO. : 6,738,082 B1
APPLICATION NO. : 09/584593
DATED : May 18, 2004
INVENTOR(S) : Dong et al.

It is certified that error appears in the above-identified patent and that said Letters Patent is hereby corrected as shown below:

Col. 10, line 36: before "selected" delete "a".

Col. 11, line 1: after "means for" delete "processing" and insert --presenting--.

Col. 11, line 3: after "moving" delete "a".

Signed and Sealed this

Twenty-seventh Day of March, 2007

JON W. DUDAS
*Director of the United States Patent and Trademark Office*